US007850218B2

(12) United States Patent
Delescluse

(10) Patent No.: US 7,850,218 B2
(45) Date of Patent: Dec. 14, 2010

(54) HANDLING CLAMP FOR A MACHINE DESIGNED FOR TENDING AN ELECTROLYTIC CELL USED FOR THE PRODUCTION OF ALUMINIUM

(75) Inventor: Patrick Delescluse, Cysoing (FR)

(73) Assignee: E.C.L., Ronchin (FR)

( * ) Notice: Subject to any disclaimer, the term of this patent is extended or adjusted under 35 U.S.C. 154(b) by 1000 days.

(21) Appl. No.: 10/545,947

(22) PCT Filed: Feb. 26, 2004

(86) PCT No.: PCT/FR2004/000430

§ 371 (c)(1),
(2), (4) Date: Mar. 3, 2006

(87) PCT Pub. No.: WO2004/079046

PCT Pub. Date: Sep. 16, 2004

(65) Prior Publication Data

US 2006/0290153 A1 Dec. 28, 2006

(30) Foreign Application Priority Data

Feb. 28, 2003 (FR) .................................. 03 02500

(51) Int. Cl.
*B25J 15/08* (2006.01)

(52) U.S. Cl. ...................................... 294/115; 294/106

(58) Field of Classification Search ................. 294/115, 294/110.1, 88, 106, 116
See application file for complete search history.

(56) References Cited

U.S. PATENT DOCUMENTS 3,012,811 A 12/1961 Sandrock
3,408,101 A 10/1968 Etienne
3,459,868 A 8/1969 Schlienger
3,471,194 A 10/1969 Martin
3,938,847 A * 2/1976 Peyton .................... 294/110.1
3,945,514 A 3/1976 Dose
4,032,020 A 6/1977 Kato
4,279,699 A 7/1981 Kuhn
2005/0101172 A1* 5/2005 Shi et al. .................... 439/266

FOREIGN PATENT DOCUMENTS

| | | |
|---|---|---|
| DE | 1182405 | 11/1964 |
| FR | 1190100 | 10/1959 |
| FR | 1363432 | 6/1964 |
| FR | 1437541 | 5/1966 |
| FR | 2282580 | 3/1976 |
| GB | 1300759 | 12/1972 |
| GB | 2018220 | 10/1979 |

* cited by examiner

*Primary Examiner*—Paul T Chin
(74) *Attorney, Agent, or Firm*—Baker Donelson Bearman Caldwell & Berkowitz, PC

(57) ABSTRACT

The present invention relates to a handling clamp, designed to grasp a stem fixed to a load and equipped with at least one attachment means. The stem is capable of moving between a lower position in the handling clamp and an upper position in the handling clamp when the handling clamp is closed on the stem. When the stem is in the lower position, the handling clamp is capable of being locked closed. When the stem is in the upper position, the handling clamp is capable of being unlocked. The handling clamp of the present invention is particularly adapted for use in the aluminium industry.

23 Claims, 5 Drawing Sheets

HANDLING CLAMP FOR A MACHINE DESIGNED FOR TENDING AN ELECTROLYTIC CELL USED FOR THE PRODUCTION OF ALUMINIUM

CROSS REFERENCE TO RELATED APPLICATIONS

This application claims priority to PCT/FR04/00430 filed Feb. 26, 2004, which in turn claims priority from FR 03/2500 filed Feb. 28, 2003.

FIELD OF THE INVENTION

The invention relates to factories for producing aluminium by igneous electrolysis using the Hall-Héroult process. It relates more particularly to the handling equipment used in the said factories.

STATE OF THE ART

The metal aluminium is produced industrially by igneous electrolysis, which is to say electrolysis of alumina in solution in a molten cryolite bath, called an electrolyte bath, according to the well known Hall-Héroult process. The electrolyte bath is contained in pots, called "electrolysis pots", comprising a steel shell, which is lined with refractory and/or insulating materials inside, and a cathode assembly positioned at the bottom of the pot. Anodes, typically made of a carbonaceous material, are partially immersed in the electrolyte bath. The assembly formed by an electrolysis pot, its anodes and the electrolyte bath is called an electrolytic cell.

The factories contain a large number of electrolytic cells positioned in line, in buildings called halls or electrolysis rooms, and electrically connected in series using joining conductors, in order to optimise the use of the floor space of the factories. The cells are generally positioned so as to form two or more parallel lines that are electrically connected to one another by end conductors. The electrolysis current therefore passes in cascade from one cell to the next.

In operation, an electrolysis factory requires work to be carried out on the electrolytic cells, including in particular the replacement of worn anodes by new anodes, tapping of liquid metal of the cells and extracting or adding electrolyte. The most modern factories are equipped with a lifting and handling unit comprising a travelling crane, which can be moved in a translation movement above the electrolytic cells and along them, and a carriage equipped with several handling and working elements (often called "tools"), such as shovels and hoists.

The handling element designed to handle and move loads such as anodes comprises a clamp capable of gripping the load, called "handling clamp". For example, when handling the anodes, this clamp is positioned close to the stem of the anode that is to be clamped, then closed around the stem such that it allows the anode to be lifted. The anode is then moved and then positioned or placed at the desired location.

However, it is possible that the load may accidentally be dropped, usually because it has been accidentally released during handling, for example due to untimely opening of the clamp (typically arising from an incorrect open command).

The applicant has therefore sought to make handling clamps which permit these drawbacks to be overcome, whilst remaining reliable, simple and compact.

SUMMARY OF THE INVENTION

An object of the invention is a handling clamp designed for the industrial production of aluminium by igneous electrolysis, capable of gripping a load by a gripping element (called "stem" hereafter) attached to the said load, and comprising locking means capable of preventing the clamp from opening when the load is suspended from it.

More specifically, the handling clamp of the invention, which is designed to grab a load equipped with a stem, comprises:

- at least one mobile gripping element, typically a jaw, with an open and a closed positions,
- an actuating system to move the gripping element(s) between the open and closed positions,
- attachment means capable of limiting the axial movements of the stem in the clamp between a first position called "lower" and a second position called "upper" when the gripping element(s) is/are in the closed position,
  - at least one locking system, preferably mechanical, capable of locking the said gripping element(s) in the closed position when it is locked (or "engaged"), the said locking system being locked when the stem is in the lower position and unlocked ("disengaged") when the stem is in the upper position.

The applicant had the idea of fitting the clamp with a locking system that is locked or unlocked by the sole movement of the stem in the clamp. When it is locked, the locking system locks the gripping element(s) in the closed position, thus preventing the clamp from opening and the stem from being freed. The locking is therefore controlled by the presence and the position of the stem in the clamp, which avoids the untimely release of the load in the event of the actuating means of the mobile gripping element(s) of the clamp failing.

Another object of the invention is the use of the clamp of the invention in a factory for producing aluminium by igneous electrolysis, in particular for handling the anodes made of carbonaceous or other materials.

Another object of the invention is a lifting and handling unit comprising at least one load (typically anodes) handling element, equipped with a handling clamp according to the invention.

BRIEF DESCRIPTION OF THE FIGURES

The invention will be easier to understand with the help of the detailed description of its preferred embodiments, which are described below and which are illustrated with the aid of the appended figures.

DETAILED DESCRIPTION OF A PREFERRED EMBODIMENT

Figure 1:
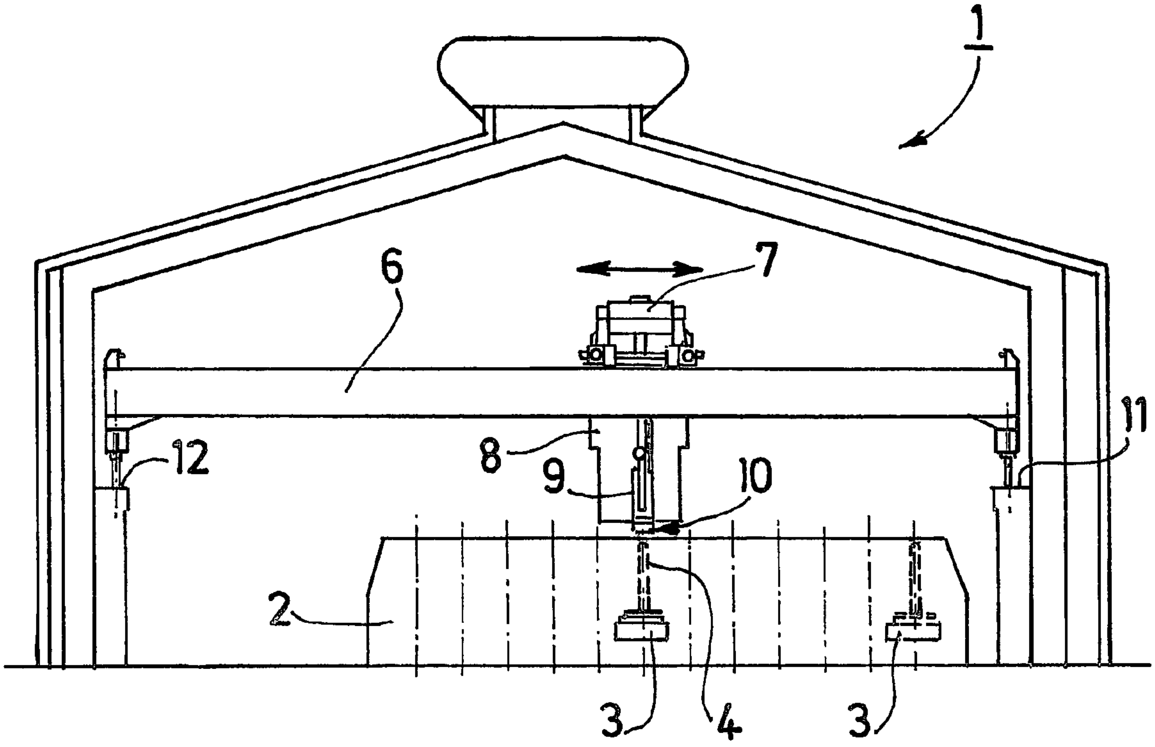
FIG. 1 illustrates a typical electrolysis room, in a cross-sectional view, designed for the production of aluminium.
Figure 2:
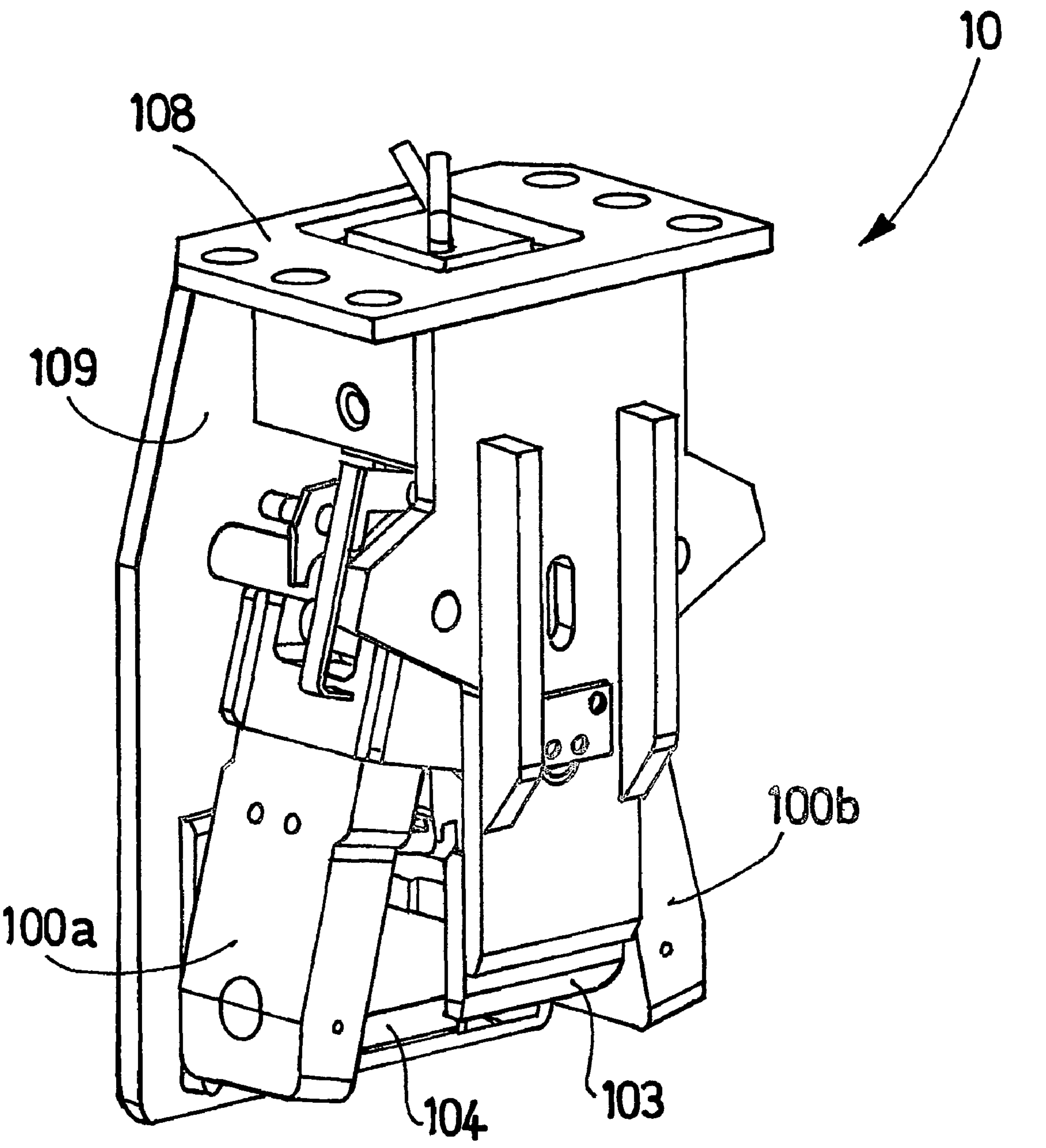
FIG. 2 illustrates, in a side view, a handling clamp of the invention.

The electrolysis factories designed for the production of aluminium include a zone for producing liquid aluminium, which comprises one or more electrolysis rooms (1). As illustrated in FIG. 1, each electrolysis room (1) comprises electrolytic cells (2) and at least one lifting and handling unit, or "pot tending machine", (6, 7, 8, 9, 10). The electrolytic cells (2) are normally positioned in rows or lines (typically side by side or end to end), each row or line typically containing one or several hundreds of cells. The said cells (2) comprise a series of anodes (3) equipped with a metal stem (4) designed for the attachment and electrical connection of the anodes to a metallic anode frame (not illustrated). The anode stem (4) typically has a cross section that is substantially rectangular or square.

The lifting and handling unit (6, 7, 8, 9, 10) is used to perform operations on the cells such as changing an anode or filling the feed hoppers of the electrolytic cells with crushed bath and $AlF_3$. It can also be used to handle various loads, such as pot elements, ladles of liquid metal or anodes. The said unit (6, 7, 8, 9, 10) typically comprises a travelling crane (6), a carriage (7) capable of moving on the travelling crane (6), and handling and work elements (often called "tools")) (8, 9, 10), such as a cabin (8) for the operator, a crust shovel (not illustrated), a crust breaker (not illustrated) or a handling element (9) equipped with a gripping or handling clamp (10). The latter element is particularly designed for handling anodes (3), even though it may also be used for handling other loads.

The travelling crane (6) is seated and moves on running tracks (11, 12) positioned parallel to one another and to the main axis—and typically longitudinally—from the hall (and the line of cells). The travelling crane (6) can therefore be moved along the electrolysis room (1).

In the invention, the handling clamp (10), which is designed to grasp a stem (4) attached to a load (3)—typically an anode—and equipped with at least one attachment means (5, 5*a*, 5*b*), typically a cavity, comprises:

- at least one mobile gripping element (100*a*, 100*b*), typically a jaw, with an open position capable of forming an opening, typically facing downwards in use, in which the stem (4) can be inserted, and a closed position capable of retaining the stem (4),
- an actuating system (110) to move the/each gripping element (100*a*, 100*b*) between the open and closed positions,
- at least one attachment means (101*a*, 101 *b*) capable of co-operating with the one or more corresponding attachment mean(s) (5, 5*a*, 5*b*) of the stem (4) so as to limit the axial movements of the stem (4) in the clamp (10) between a "lower" position and an "upper" position when the/each gripping element (100*a*, 100*b*) is in the closed position,
- at least one locking system (120) capable of locking the/each gripping element (100*a*, 100*b*) in the closed position when it is locked, and capable of being locked when the stem (4) is in the lower position and unlocked when the stem (4) is in the upper position.

In the open position, the gripping element(s) create enough space to allow the stem to be inserted in the clamp.

The/each gripping element (100*a*, 100*b*) is advantageously capable of pivoting around an axis (105).

The clamp (10) typically comprises two gripping elements (100*a*, 100*b*), which are advantageously capable of pivoting around an axis (105) specific to each gripping element or common to both gripping elements. The clamp (10) is then typically symmetrical with respect to an axis C, called the "central axis", which may also coincide with the axis of the stem (4). The axis/axes (105) are preferably substantially perpendicular to the axis C, so that they are substantially in a horizontal position during use.

The attachment means (101*a*, 101*b*) of the clamp (10) typically comprise a protrusion on the/each gripping element (100*a*, 100*b*) and the corresponding attachment element(s) (5, 5*a*, 5*b*) of the stem (4) comprising at least one cavity. The protrusion(s) (101*a*, 101*b*) of the/each gripping element (100*a*, 100*b*) are capable of cooperating with the corresponding cavity(ies) (5, 5*a*, 5*b*) of the stem (4) so as to limit the axial movements of the stem (4) between the said lower and upper positions when the/each gripping element (100*a*, 100*b*) is in the closed position. The dimensions of the attachment means (101*a*, 101*b*, 5, 5*a*, 5*b*) are such that, when they are engaged, the stem (4) can still be moved between the upper position, in which the locking system (120) is unlocked (as illustrated in FIG. 5(E)), and the lower position, in which the locking system (120) is locked (as illustrated in FIG. 5(F)). This may be achieved by providing one or more cavities (5, 5*a*, 5*b*) with sufficient clearance to permit these movements.

The attachment means (101*a*, 101*b*) of the clamp (10) and the one or more corresponding attachment means (5, 5*a*, 5*b*) of the stem (4) are advantageously such that they substantially limit—and possibly prevent—the rotation of the stem (4) around its axis A, which ensures precise positioning of the load fixed to the stem, in general an anode.

Typically, the clamp comprises among others a clamp body (109) and a means of attachment (108). The latter especially permits the clamp (10) to be fixed to a handling element (9).

In one preferred embodiment of the invention, the locking system (120) comprises at least one locking element (102*a*, 102*b*), such as a tooth or a hook, fixed to each gripping element (100*a*, 100*b*), and at least one moving lock (121) with at least one first position called "locking" and a second position called "release" or "unlocking", the said lock (121) being:

- capable of moving from the release position to the locking position when the/each gripping element (100*a*, 100*b*) is in the closed position and the stem (4) is in the lower position,
- capable of co-operating with the/each locking element (102*a*, 102*b*) so as to permit the movement of the/each gripping element (100*a*, 100*b*) when it is in the release position and to maintain the/each gripping element (100*a*, 100*b*) in the closed position when it is in the locking position,
- and capable of being moved from the locking position to the release position by an axial movement of the stem (4) from the lower position to the upper position.

In this embodiment, the locking system (120) of the clamp (10) is locked (or "engaged") when, at the same time, the gripping element(s) (100*a*, 100*b*) are in the closed position and the stem (4) is in the lower position, which typically occurs when the load is suspended from the clamp (10), and it is unlocked when the stem (4) is in the upper position, which typically occurs when the clamp (10) exerts pressure on the stem (4). The clamp (10) of the invention thus permits locking or unlocking of the said locking system (120) by a simple relative movement of the stem (4) with respect to the clamp (and typically in the clamp).

In use, the locking position of the lock (121) is typically a lower position and the release position is typically an upper position, which permits the locking system (120) to be locked by the effect of gravity. In this case, the lock (121) is advantageously capable of being moved along a central symmetrical axis C of the clamp (10).

In order to make locking possible, the lock (121) is typically equipped with at least one cavity (126*a*, 126*b*), such as a notch or a mortise, capable of cooperating with the/each locking element (102*a*, 102*b*) so as to prevent the movement of the/each gripping element (100*a*, 100*b*) from the closed position to the open position.

Preferably, the lock (121) has a wait position—which is typically the said locking position but which may be different—and is situated in the clamp such that the stem (4) can move it from the wait position to the release position when it is inserted into the clamp. To this end, the lock (121) may feature a thrust element (124), such as a nipple, and is capable of being moved from the wait position to the said release position by a thrust of the stem (4)- and more precisely the end (4') of the stem (4) on the said thrust element (124). The said thrust element (124) is typically situated close to the end (127) of the lock (121) located on the opening side of the clamp.

The clamp (10) may also include at least one guide part (122, 123) capable of guiding the movement of the lock (121) when it moves between its different positions. In the embodiment illustrated in FIG. 4, the clamp (10) comprises a first guide part (122) capable of sliding inside the lock (121) and a second guide part (123) capable of guiding the "lower" end (127) of the lock (121). The first guide part (122) is typically fixed to a ball joint or a transversal or axial pin. In the example shown in FIG. 4, the second guide part (123) also acts as a stop.

In one preferred embodiment of the invention, the locking system (120) further comprises at least one return means, such as an elastic element for example, (125) capable of causing the lock (121) to move from the release position to the locking position, and capable of maintaining it in this latter position, when each or the gripping element (100*a*, 100*b*) is in the closed position and the stem (4) is in the lower position. The return means (125), which is typically a spring, is advantageously incorporated into the lock (121) in order to isolate it form the surrounding environment and, possibly, to lubricate it, in order to maintain its elasticity and avoid it being damaged. To this end, the return means (125) is advantageously situated in a cavity inside the lock (121) and/or in a cavity inside one of the guide parts (122) of the lock. In the example shown in FIG. 4, the return means (125) is partially situated in a cavity inside the lock (121) and partially in a cavity inside a guide part (122) of the lock.

In one advantageous variant of the invention, the locking system (120) further comprises at least one means, called locking means, capable of maintaining the/each gripping element (100*a*, 100*b*) in the open position when the lock (121) is in the locking position or in the wait position, as illustrated in FIGS. 5(B), 4(B) and 4(C). These locking means mechanically prevent the clamp from closing when the stem is not in the correct position inside it, especially when the stem is not positioned in the clamp so that it may allow the attachment means (101*a*, 101*b*, 5, 5*a*, 5*b*) to be engaged between the stem and the clamp. This variant also permits unhindered insertion of the stem in the clamp. The said locking means are advantageously formed by the lock (121) and the locking elements (102*a*, 102*b*) which are such that the said elements press on the lock when it is in the wait position (typically the lock position), so as to prevent the gripping element(s) from closing.

Figure 4:
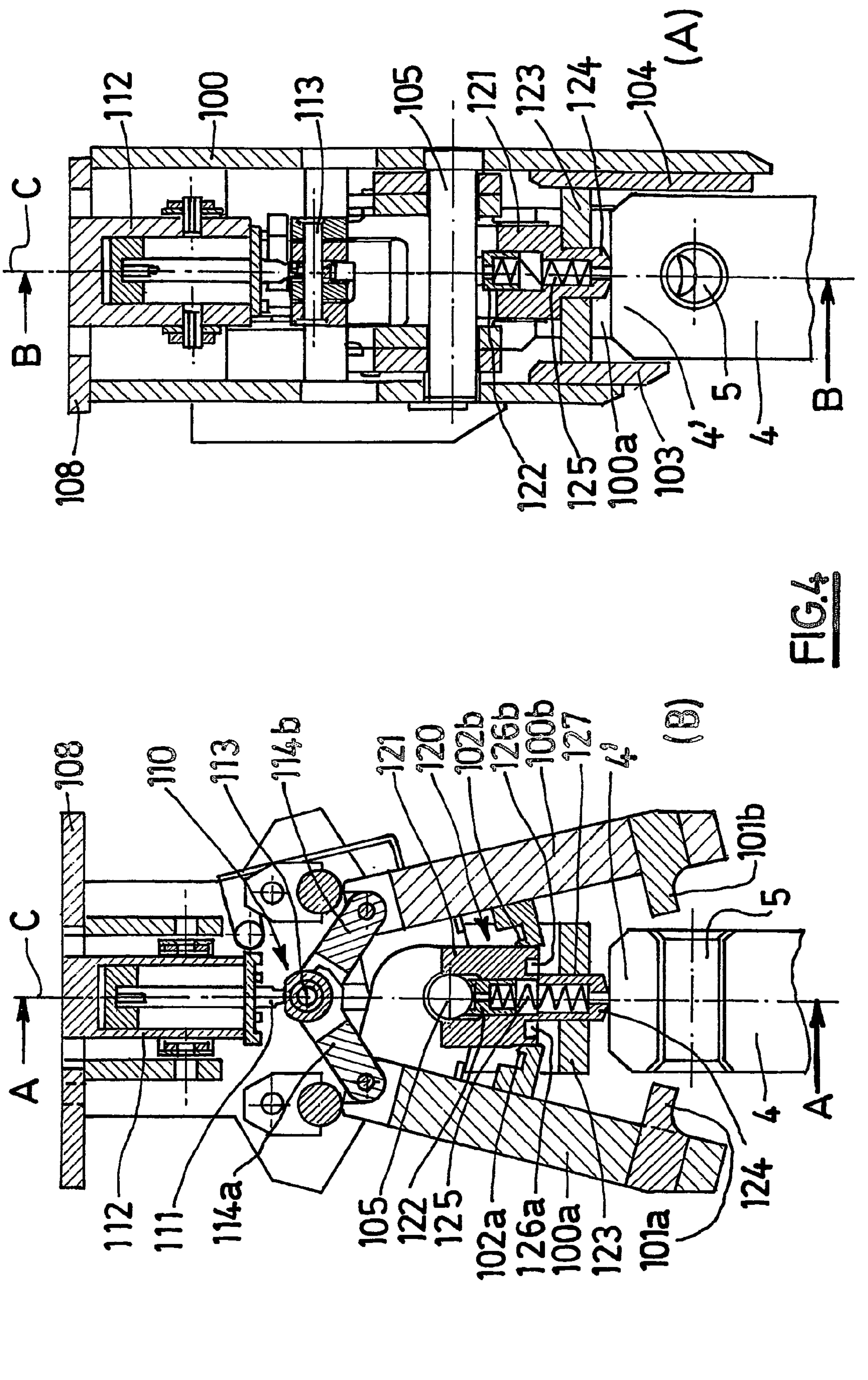
FIG. 4 illustrates a handling clamp of the invention, in a longitudinal sectional view in two perpendicular planes (planes A-A and B-B).
Figure 5:
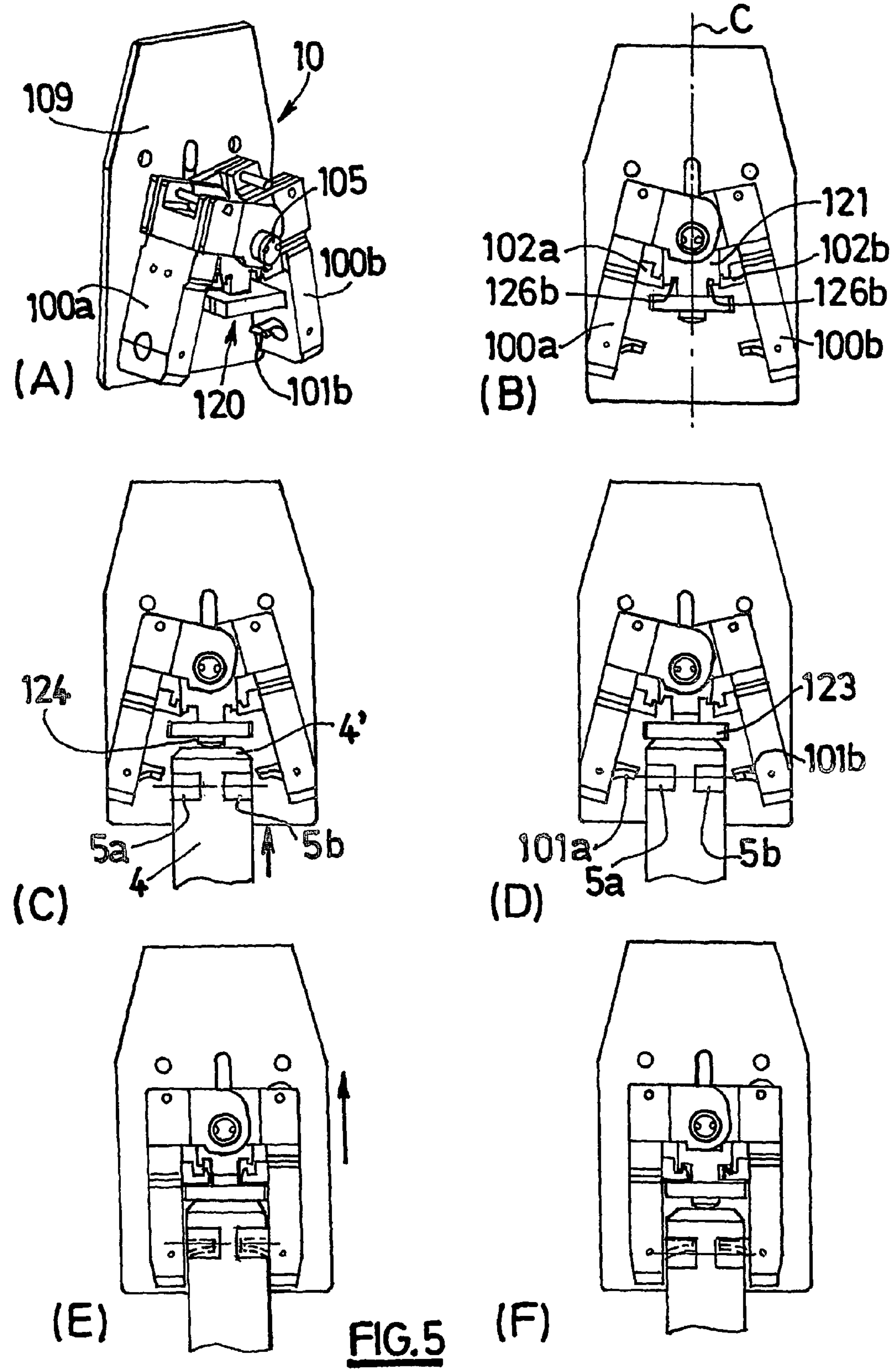
FIG. 5 illustrates the operation of the gripping clamp locking system of the invention with the aid of a specific example.

As illustrated in FIGS. 4 and 5, the clamp (10) can comprise among others one or more guide parts (103, 104) of the stem (4) to ensure correct positioning of it between the gripping elements (100*a*, 100*b*) of the clamp. It is possible to limit the travel of the stem (4) in the clamp by a stop (123).

The gripping elements (100*a*, 100*b*) and/or the guide parts (103, 104) preferably define a cavity which matches the form of the stem in order to limit or even prevent it from rotating.

Figure 3:
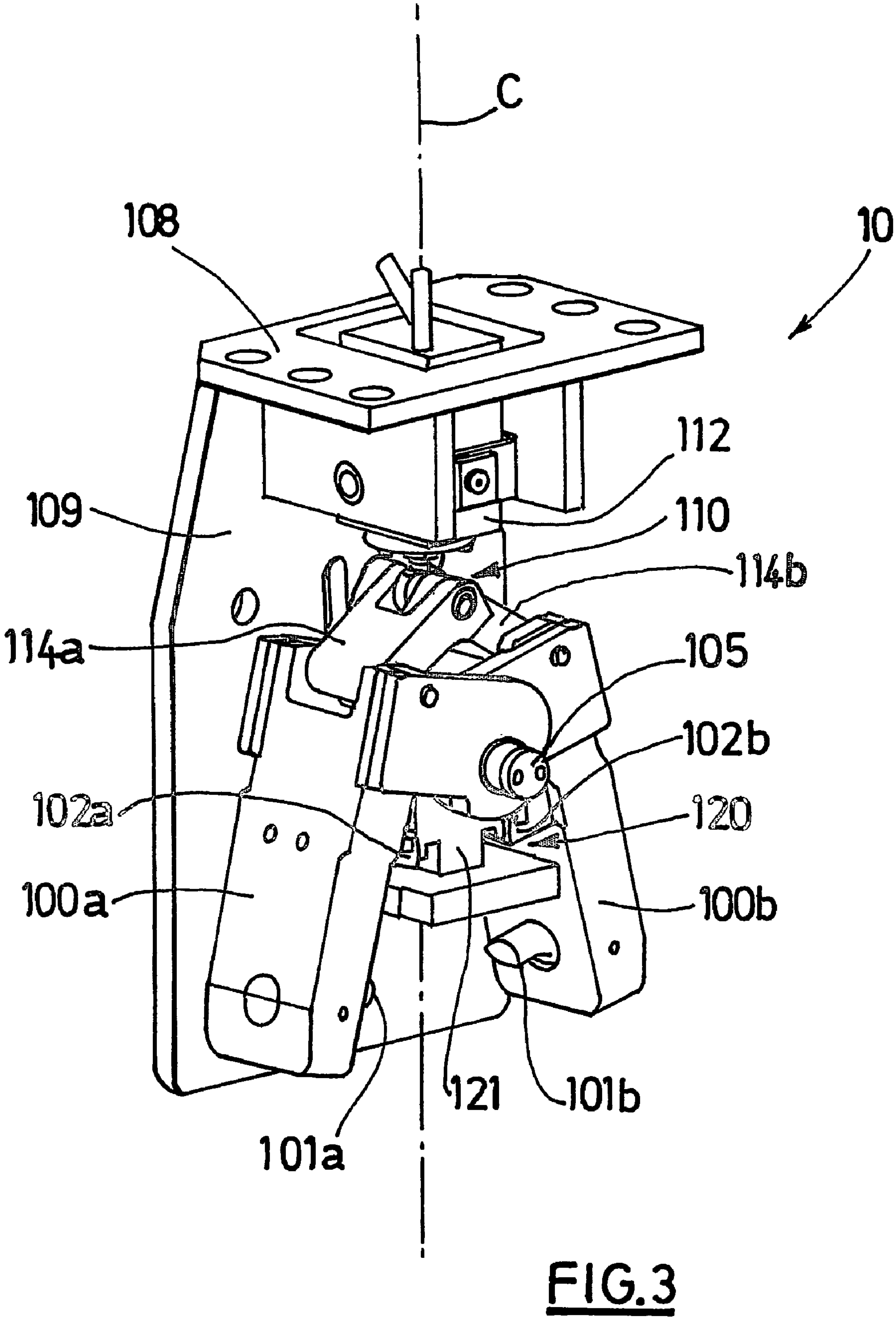
FIG. 3 illustrates, in a side view, the mobile parts of a handling clamp of the invention.

The gripping elements (100*a*, 100*b*) of the clamp may be actuated by different means. FIGS. 3 and 4 illustrate a clamp (10) in which the actuating system (110) comprises two connecting rods (114*a*, 114*b*) and an actuator (112), which is typically a jack. The actuator (112) and the connecting rods (114*a*, 114*b*) are typically connected by a common actuating axis (113) fixed to the actuating rod (111) of the actuator. This variant has the advantage of being simple, reliable and efficient.

The clamp of the invention advantageously comprises two mobile gripping elements (100*a*, 100*b*) and the lock (121) is preferably situated between these two gripping elements. This configuration makes possible a compact construction and protects the lock from collisions with external elements.

The locking system (120) is preferably entirely mechanical, such as that illustrated in FIGS. 3 to 5, in order to avoid failure modes related to electrical or electromechanical elements.

The operation of the locking system (120) of the clamp (10) of the invention is illustrated with the aid of the specific example of FIG. 5. The actuating system (110) of the clamp is not shown in order to simplify the figure.

When the lock (121) is in the release position (FIG. 5(D)), the gripping elements (100*a*, 100*b*) can pivot freely around their respective (or common) axis (105) and permit, in particular, the positioning of the locking element(s) (102*a*, 102*b*) aligned with each corresponding cavity (126*a*, 126*b*) and the engagement of the attachment means (101*a*, 101*b*, 5, 5*a*, 5*b*), typically by inserting the protrusions (101*a*, 101*b*) into the corresponding cavities (5, 5*a*, 5*b*) of the stem (4). The gripping elements (100*a*, 100*b*) are locked when the clamp (10) is pulled upwards and the stem (4) drops down under the effect of its own weight and that of the load (FIG. 5(E)). The lowering of the stem (4) is stopped by the attachment means (101*a*, 101*b*, 5, 5*a*, 5*b*). When the lock (121) is in the locking position, the locking element(s) (102*a*, 102*b*) are inserted into the corresponding cavity(ies) (126*a*, 126*b*) and cooperate with them so as to prevent the gripping elements (100*a*, 100*b*) of the clamp (10) from opening (FIG. 5(F)). Locking is effective as long as the load is suspended. The locking system is unlocked by raising the stem in the clamp, which is typically obtained by pressing on the load. Such a system has the advantage of not requiring any additional actuators and consequently increasing the reliability of the device. It also has the advantage of providing a locking action that is independent of the weight of the load and the friction between the attachment means (101*a*, 101*b*, 5, 5*a*, 5*b*).

In the example illustrated in FIG. 5, the lock (121) has a wait position (FIGS. 5(A) and 5(B)) which is the same as the locking position (FIG. 5(F)). In this case, the locking elements (102*a*, 102*b*) cooperate with the lock (121), by pressing on the latter so as to prevent the clamp from closing as long as the stem (4) is not sufficiently inserted to allow the protrusions (101*a*, 101*b*) and the cavities (5, 5*a*, 5*b*) to be aligned. The locking elements (102*a*, 102*b*) cooperate with the lock (121) by means of a cam effect. When it is inserted between the gripping elements of the clamp, the stem (4) pushes the lock (121) upwards, pressing on the thrust element (124), until the movement of the locking elements is no longer hindered by the lock (FIG. 5(C)). This variant has the advantage of simply preventing the load from being gripped until the locking system is ready to be engaged.

Another object of the invention is a lifting and handling unit (6, 7, 8, 9, 10) comprising at least one load handling element (for loads such as anodes) (9) equipped with a handling clamp (10) according to the invention.

The invention permits double command systems to be avoided. It also has the advantage of being practically unaffected by accelerations during handling.

LIST OF THE NUMBERED REFERENCES

List of the numbered references

| | |
|---|---|
| 1 | Electrolysis room |
| 2 | Electrolytic cell |
| 3 | Load, typically an anode |
| 4 | Stem, typically an anode stem |
| 4' | End of the stem, typically the head of the anode stem |
| 5, 5a, 5b | Attachment means of the stem, typically cavities |
| 6 | Travelling crane |
| 7 | Carriage |
| 8 | Cabin |
| 9 | Handling element |
| 10 | Handling clamp |
| 11, 12 | Running tracks |
| 100a, 100b | Gripping elements of the clamp |
| 101a, 10lb | Attachment means of the clamp, typically protrusions |
| 102a, 102b | Locking elements |
| 103, 104 | Stem guide parts |
| 105 | Rotational axis of the gripping elements |
| 108 | Means of attachment |
| 109 | Clamp body |
| 110 | Actuating system |
| 111 | Actuating rod |
| 112 | Actuator (jack) |
| 113 | Actuating axis |
| 114a, 114b | Connecting rods |
| 120 | Locking system |
| 121 | Mobile lock |
| 122 | Guide part of the lock |
| 123 | Guide part of the lock; Stop |
| 124 | Thrust element of the lock |
| 125 | Return means |
| 126a,126b | Cavities |
| 127 | End of the lock |

The invention claimed is:

1. A handling clamp, designed to grasp a stemfixed to a load and equipped with at least one attachment means, comprising:

at least one mobile gripping element, with an open position capable of forming an opening, in which the stem can be inserted, and a closed position capable of retaining the stem, an actuating system to move said at least one gripping element between the open and closed positions, wherein said actuating system comprises two connecting rods and an actuator, and further wherein the actuator and the connecting rods are connected by a common actuating axis fixed to the actuating rod of the actuator, at least one attachment means capable of cooperating with the one or more corresponding attachment means of the stem so as to limit the axial movements of the stem in the clamp between a lower position and an upper position when said at least one gripping element is in the closed position, at least one locking system comprising at least one locking element fixed to the at least one gripping element, said locking system being capable of locking said at least one gripping element in the closed position when it is locked, and capable of being locked when the stem is in the lower position and unlocked when the stem is in the upper position.

2. A clamp of claim 1, wherein said at least one gripping element is capable of pivoting around an axis.

3. A clamp of claim 1, comprising two gripping elements.

4. A clamp of claim 3, wherein the two gripping elements are capable of pivoting around an axis specific to each gripping element or common to the two gripping elements.

5. A clamp of claim 1 wherein the attachment means of the clamp comprises at least one protrusion on said at least one gripping element, and wherein said corresponding attachment means of the stem comprises at least one cavity.

6. A clamp of claim 1 wherein the locking system comprises at least one locking element, fixed to each gripping element, and at least one mobile lock with at least a locking position and a release position said at least one mobile lock being capable of moving from the release position to the locking position when said at least one gripping element is in the closed position and the stem is in the lower position, capable of cooperating with said at least one locking element so as to permit the movement of said at least one gripping element when in the release position and to maintain said at least one gripping element in the closed position when in the locking position, and capable of being moved from the locking position to the release position by an axial movement of the stem from the lower position to the upper position.

7. A clamp of claim 6, wherein, in use, the locking position of the lock is a lower position and the release position is an upper position.

8. A clamp of claim 6, wherein the lock is equipped with at least one cavity capable of cooperating with said at least one locking element so as to prevent the movement of said at least one gripping element from the closed position to the open position.

9. A clamp of claim 6 wherein the lock has a wait position and is situated in the clamp so that the stem can move the lock from the wait position to the said release position when it is inserted into the clamp.

10. A clamp of claim 9, wherein the wait position is the same as the locking position.

11. A clamp of claim 9 wherein the lock comprises a thrust element, and is capable of being moved from the wait position to said release position by a thrust of the stem on the said thrust element.

12. A clamp of claim 11, wherein the thrust element is situated proximate the end of the lock situated on the opening side of the clamp.

13. A clamp of claim 6, comprising at least one guide part capable of guiding movement of the lock during movements between its different positions.

14. A clamp of claim 6, wherein the locking system comprises at least one return means capable of making the lock move from the release position to the locking position, and capable of maintaining said lock in said locking position, when said gripping element is in the closed position and the stem is in the lower position.

15. A clamp of claim 14, wherein the return means is an elastic element.

16. A clamp of claim 14 wherein a return means is situated in a cavity inside the lock, or in a cavity inside the guide part, or in a cavity inside the lock and in a cavity inside the guide part.

17. A clamp of claim 14, wherein a return means is partially situated in a cavity inside the lock and partially in a cavity inside a guide part.

18. A clamp of claim 6 wherein the locking system further comprises at least one locking means, capable of maintaining said at least one gripping element in the open position when the lock is in the locking position or in the wait position.

19. A clamp of claim 6 comprising two mobile gripping elements and wherein the lock is situated between said two gripping elements.

20. A clamp of claim 1, wherein the actuator is a jack.

21. A clamp of claim 1, wherein the locking system is entirely mechanical.

22. A lifting and handling unit comprising at least one load handling element equipped with a handling clamp according to claim 1.

23. A method for using a clamp of claim 1 in a factory for producing aluminium by igneous electrolysis, comprising employing said clamp for handling anodes made of carbonaceous or other materials.

* * * * *